United States Patent
Kamangar et al.

(10) Patent No.: US 8,078,494 B2
(45) Date of Patent: *Dec. 13, 2011

(54) METHODS AND APPARATUS FOR ORDERING ADVERTISEMENTS BASED ON PERFORMANCE INFORMATION AND PRICE INFORMATION

(75) Inventors: Salar Arta Kamangar, Mountain View, CA (US); Eric Veach, Redwood City, CA (US); Ross Koningstein, Menlo Park, CA (US)

(73) Assignee: Google, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/830,908

(22) Filed: Jul. 6, 2010

(65) Prior Publication Data

US 2010/0274660 A1 Oct. 28, 2010

Related U.S. Application Data

(63) Continuation of application No. 10/112,654, filed on Mar. 29, 2002, now Pat. No. 7,778,872.

(51) Int. Cl.
  *G06Q 30/00* (2006.01)
  *G06F 3/048* (2006.01)
(52) U.S. Cl. ............... 705/14.52; 705/14.43; 705/14.73; 715/210
(58) Field of Classification Search ............... 705/14.43, 705/14.73; 715/210
  See application file for complete search history.

(56) References Cited

U.S. PATENT DOCUMENTS

| | | | | |
|---|---|---|---|---|
| 6,269,361 | B1 * | 7/2001 | Davis et al. | 1/1 |
| 6,907,566 | B1 * | 6/2005 | McElfresh et al. | 715/210 |
| 7,778,872 | B2 * | 8/2010 | Kamangar et al. | 705/14.52 |

OTHER PUBLICATIONS

Flycast: Kemp, Ted, "Flycast introduces cost-per-click ads", DM News, p. 20(1), Dec. 13, 1999.*

* cited by examiner

*Primary Examiner* — Donald L Champagne
(74) *Attorney, Agent, or Firm* — John C. Pokotylo; Straub & Pokotylo

(57) ABSTRACT

An ordering of advertisements requested by an ad consumer is based on scores generated for the ads. In each case, a score may be a function of at least one performance parameter associated with the ad and/or a price parameter associated with the ad. The ad consumer may generate presentation information (e.g., a Web page) including advertisements and non-advertisement content (e.g., search results) by (i) accepting the non-advertisement content and advertisements, each of the advertisements including a score, and (ii) combining the non-advertisement content and the advertisements such that relative placements of the advertisements are based on their associated scores.

12 Claims, 5 Drawing Sheets

METHODS AND APPARATUS FOR ORDERING ADVERTISEMENTS BASED ON PERFORMANCE INFORMATION AND PRICE INFORMATION

§0. RELATED APPLICATIONS

This application is a continuation application of U.S. patent application Ser. No. 10/112,654 (referred to as "the '654 application and incorporated herein by reference), filed on Mar. 29, 2002, now U.S. Pat. No. 7,778,872 titled "METHODS AND APPARATUS FOR ORDERING ADVERTISEMENTS BASED ON PERFORMANCE INFORMATION AND PRICE INFORMATION," listing Salar Kamangar, Ross Koningstein and Eric Veach as the inventors, and claiming benefit, under 35 U.S.C. §119(e)(1), to the filing date of provisional patent application Ser. No. 60/317,847 (referred to as "the '847 application" and incorporated herein by reference), titled "METHODS AND APPARATUS FOR ORDERING ADVERTISEMENTS", filed on Sep. 6, 2001 and listing Jane Manning, Salar Kamangar, and Eric Veach as the inventors, for any inventions disclosed in the manner provided by 35 U.S.C. §112, ¶ 1.

§1. BACKGROUND OF THE INVENTION

§1.1 Field of the Invention

The present invention concerns advertising. In particular, the present invention concerns how ads are presented to their audience.

§1.2 Related Art

Advertising using traditional media, such as television, radio, newspapers and magazines, is well known. Advertisers have used these types of media to reach a large audience with their advertisements ("ads"). To reach a more responsive audience, advertisers have used demographic studies. For example, advertisers may use broadcast events such as football games to advertise beer and action movies to a younger male audience. Similarly, advertisers may use magazines that reach a relatively affluent readership to advertise luxury items such as expensive watches and luxury automobiles. However, even with demographic studies and entirely reasonable assumptions about the typical audience of various media outlets, advertisers recognize that much of their ad budget is simply wasted. Unfortunately, it is very difficult to identify and eliminate such waste.

Recently, advertising over more interactive media has become popular. For example, as the number of people using the Internet has exploded, advertisers have come to appreciate media and services offered over the Internet as a potentially powerful way to advertise.

Advertisers have developed several strategies in an attempt to maximize the value of such advertising. In one strategy, advertisers use popular presences or means for providing interactive media or services (referred to as "Web sites" in the specification without loss of generality) as conduits to reach a large audience. Using this first approach, an advertiser may place ads on the home page of the New York Times Web site, or the USA Today Web site, for example. In another strategy, an advertiser may attempt to target its ads to more narrow niche audiences, thereby increasing the likelihood of a positive response by the audience. For example, an agency promoting tourism in the Costa Rican rainforest might place ads on the ecotourism-travel subdirectory of the Yahoo Web site.

Regardless of the strategy, Web site-based ads (also referred to as "Web ads") are typically presented to their advertising audience in the form "banner ads"—i.e., a rectangular box that includes graphic components. When a member of the advertising audience (referred to as a "viewer" in the Specification without loss of generality) selects one of these banner ads by clicking on it, embedded hypertext links typically direct the viewer to the advertiser's Web site. This process, wherein the viewer selects an ad, is commonly referred to as a "click-through". The ratio of the number of click-throughs to the number of impressions of the ad (i.e., the number of times an ad is displayed) is commonly referred to as the "click-through rate" of the ad.

Despite the initial promise of Web site-based advertisement, there remain several problems with existing approaches. Although advertisers are able to reach a large audience, they are frequently dissatisfied with the return on their advertisement investment. Some have attempted to improve ad performance by tracking the online habits of users, but this approach has led to privacy concerns.

Similarly, the hosts of Web sites on which the ads are presented (referred to as "Web site hosts" or "ad consumers") have the challenge of maximizing ad revenue without impairing their users' experience. Some Web site hosts have chosen to place advertising revenues over the interests of users. One such Web site is "GoTo.com", which hosts a so-called "search engine" service returning "search results" in response to user queries. The GoTo.com web site permits advertisers to pay to position their Web site (or a target Web site) higher up on the list of search results. If such schemes are implemented such that the advertiser only pays if a user clicks on the ad (i.e., cost-per-click), the advertiser lacks incentive to target the ads effectively, since a poorly targeted ad will not be clicked and therefore will not require payment. As a result, high cost-per-click ads show up near or at the top, but do not necessarily translate into real revenue for the ad publisher because viewers don't click on them. Furthermore, ads that viewer would click on are further down the list, or not on the list at all, and so relevancy of ads is compromised.

There remains, therefore, a need for more effective advertising using interactive media and services, including a need to order ads in a manner that maximizes both their relevance and their economic value.

§2. SUMMARY OF THE INVENTION

The present invention provides a more effective advertising system which orders ads an a manner that maximizes both their relevance and their economic values. Such ordering may be done based on both accepted ad price information and ad performance information.

The price information is may be based on (a) an amount an advertiser has agreed to pay each time the ad is rendered, (b) an amount an advertiser has agreed to pay each time the ad is rendered and selected, (c) an average over time of the amount the advertiser has agreed to pay each time the ad is rendered and selected, (d) an amount the advertiser has agreed to pay each time the ad is rendered and a conversion, associated with the ad, occurs, (e) cost per selection information, (f) an average of cost per selection information over a period of time, etc.

The performance information is a measure of user interest in the associated advertisement and may be, for example, (a) a click-through rate of the associated advertisement, (b) user ratings of the advertisement, (c) focus group ratings of the advertisement, (d) a measure of user interest for the advertisement weighted for a size of the advertisement relative to that of other advertisements, (e) a measure of user interest for the advertisement weighted for past positions of the advertisement relative to those past positions of other advertisements, (f) expected user interest in the advertisement, (g) a time needed to render the advertisement relative to that needed to render other advertisements, (h) a measure of user interest for the advertisement weighted for a media type of the advertisement, and (i) a conversion rate associated with the advertisement Price information and/or performance information may be weighted or otherwise adjusted. Window functions may be used to determine a relevant time frame or number of data to be considered.

§3. BRIEF DESCRIPTION OF THE DRAWINGS

§4. DETAILED DESCRIPTION

The present invention involves novel methods, apparatus, message formats and data structures for providing effective advertisements in an interactive environment. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventors regard their invention as the following disclosed methods, apparatus, message formats and data structures and any other patentable subject matter.

In the following, environments in which the present invention may operate are described in 4.1. Then, exemplary embodiments of the present invention are described in 4.2. An example of operations of an exemplary embodiment of the invention is then provided in 4.3. Finally, some conclusions regarding the present invention are set forth in 4.4.

§4.1 ENVIRONMENTS IN WHICH THE PRESENT INVENTION MAY OPERATE

Figure 1:
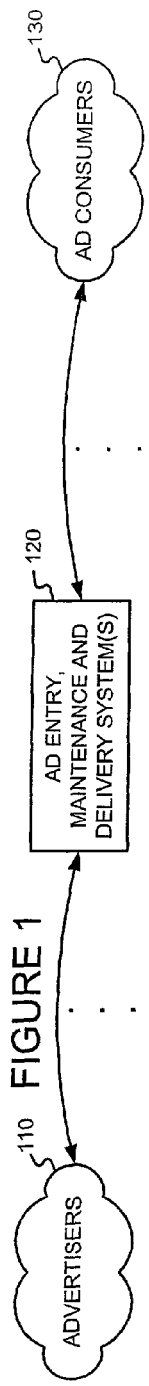
FIG. 1 is a high-level diagram showing parties or entities that can interact with an advertising system.

FIG. 1 is a high level diagram of an advertising environment. The environment may include an ad entry, maintenance and delivery system 120. Advertisers 110 may directly, or indirectly, enter, maintain, and track ad information in the system 120. The ads may be in the form of graphical ads such as so-called banner ads, text only ads, audio ads, video ads, etc. Ad consumers 130 may submit requests for ads to, accept ads responsive to their request from, and provide historical or usage information to, the system 120.

One example of an ad consumer 130 is a general content server which receives requests for content (e.g., articles, discussion threads, music, video, graphics, search results, webpage listings, etc.), and retrieves the requested content in response or otherwise services the request. The content server may submit a request for ads to the system 120. Such an ad request may include a number of ads desired. The ad request may also include the content request information. This information may include the content itself (e.g., page), a category corresponding to the content or the content request (e.g., arts, business, computers, arts-movies, arts-music, etc.), part or all of the content request, content age, content type (e.g., text, graphics, video, audio, mixed media, etc.), geolocation information, etc.

The content server may combine the requested content with one or more of the advertisements provided by the system 120. This combined information including the content and advertisement(s) is then forwarded towards the viewer that requested the content, for presentation to the viewer. Finally, the content server may transmit information about the ads and how the ads are to be rendered (e.g., position, click-through or not, impression time, impression date, size, etc.) back to the system 120.

Another example of an ad consumer 130 is a search engine. A search engine may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia (incorporated herein by reference). Such search results may include, for example, lists of Web page titles, snippets of text extracted from those Web pages, and hypertext links to those Web pages, and may be grouped into a predetermined number of (e.g., ten) search results.

The search engine may submit a request for ads to the system 120. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., WebPages), full text of identified documents, feature vectors of identified documents, etc.

The search engine may combine the search results with one or more of the advertisements provided by the system 120. This combined information including the search results and advertisement(s) is then forwarded towards the user that requested the content, for presentation to the user. Finally, the search engine may transmit information about the ad and how the ad was to be rendered (e.g., position, click-through or not, impression time, impression date, size, etc.) back to the system 120.

Figure 2:
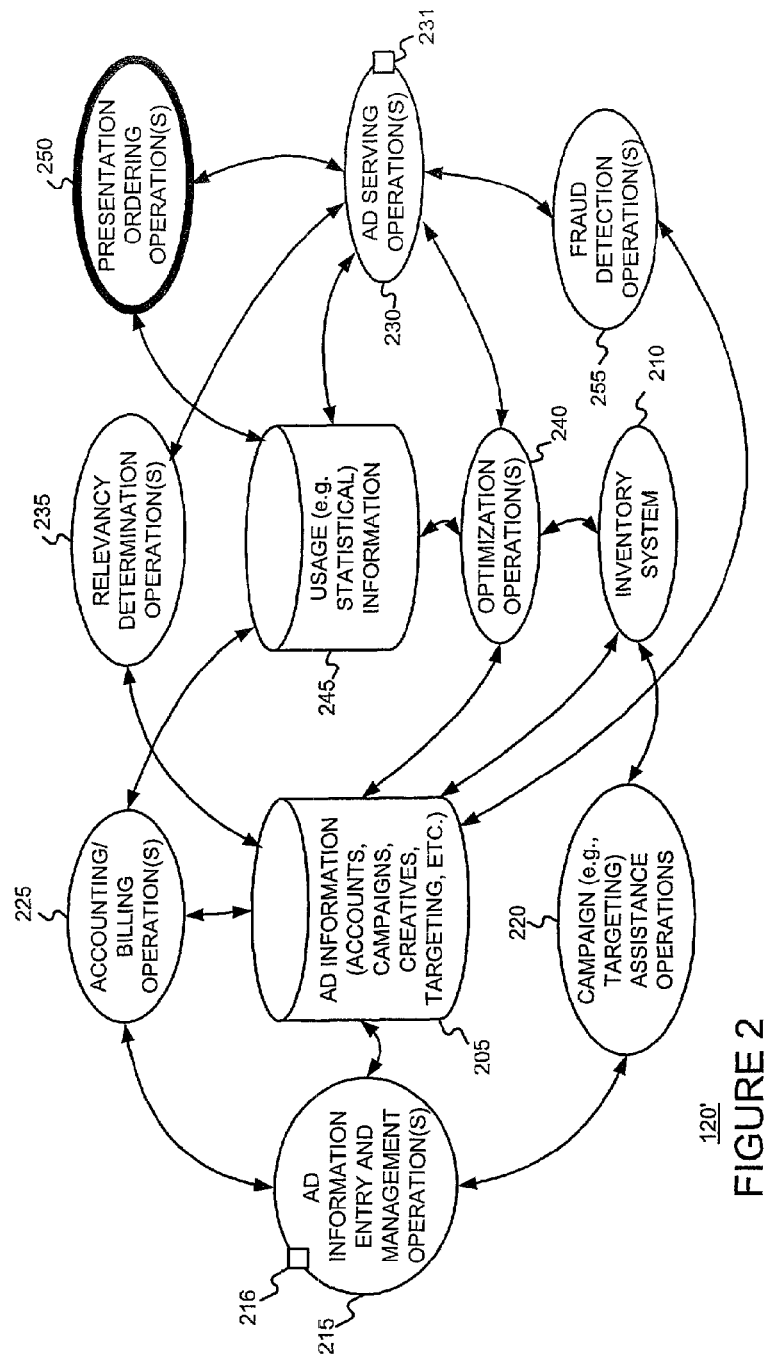
FIG. 2 is a bubble chart of an advertising environment in which the present invention may operate.

FIG. 2 illustrates an exemplary ad system 120', consistent with the present invention. The exemplary ad system 120' may include an inventory system 210 and may store ad information 205 and usage or historical (e.g., statistical) information 245. The exemplary system 120' may support ad information entry and management operation(s) 215, campaign (e.g., targeting) assistance operation(s) 220, accounting and billing operation(s) 225, ad serving operation(s) 230, relevancy determination operation(s) 235, optimization operations 240, presentation ordering operations 250, and fraud detection operation(s) 255. Advertisers 110 may interface with the system 120' via the ad information entry and management operation(s) 215 as indicated by interface 216. Ad consumers 130 may interface with the system 120' via the ad serving operation(s) 230 as indicated by interface 231.

The present invention primarily concerns the presentation ordering operation(s) 250, and is described more fully in section 4.2. For contextual purposes, however, a brief description of the other parts of ad system 120' appears below.

An advertising program includes information concerning accounts, campaigns, creatives, targeting, etc. The term "account" relates to information for a given advertiser. A "campaign" or "ad campaign" refers to a series of advertisements designed to achieve a larger objective, and may include a start date, an end date, keywords, prices, price limits, and one or more advertisements (i.e., "creatives") used to market a given good, service, class of goods, or class of services. For example, Honda may have one advertising campaign for its automotive line, and a separate advertising campaign for its motorcycle line. The campaign for its automotive line may be targeted using a variety of keywords (e.g., "accord", "sedan", etc.), each of which may be associated with one or more creatives.

The ad information 205 can be entered and managed via the ad information entry and management operation(s) 215. Campaign (e.g., targeting) assistance operation(s) 220 can be employed to help advertisers 110 generate effective ad campaigns. The campaign assistance operation(s) 220 can use information provided by the inventory system 210, which, in the context of advertising for use with a search engine, may track all possible ad impressions, ad impressions already reserved, and ad impressions available for given keywords. The ad serving operation(s) 230 may service requests for ads from ad consumers 130. The ad serving operation(s) 230 may use relevancy determination operation(s) 235 to determine candidate ads for a given request. The ad serving operation(s) 230 may then use optimization operation(s) 240 to select a final set of one or more of the candidate ads. Finally, the ad serving operation(s) 250 may use presentation ordering operation(s) 250 to order the presentation of the ads to be returned. The fraud detection operation(s) 255 can be used to reduce fraudulent use of the advertising system (e.g., by advertisers), such as through the use of stolen credit cards.

Figure 5:
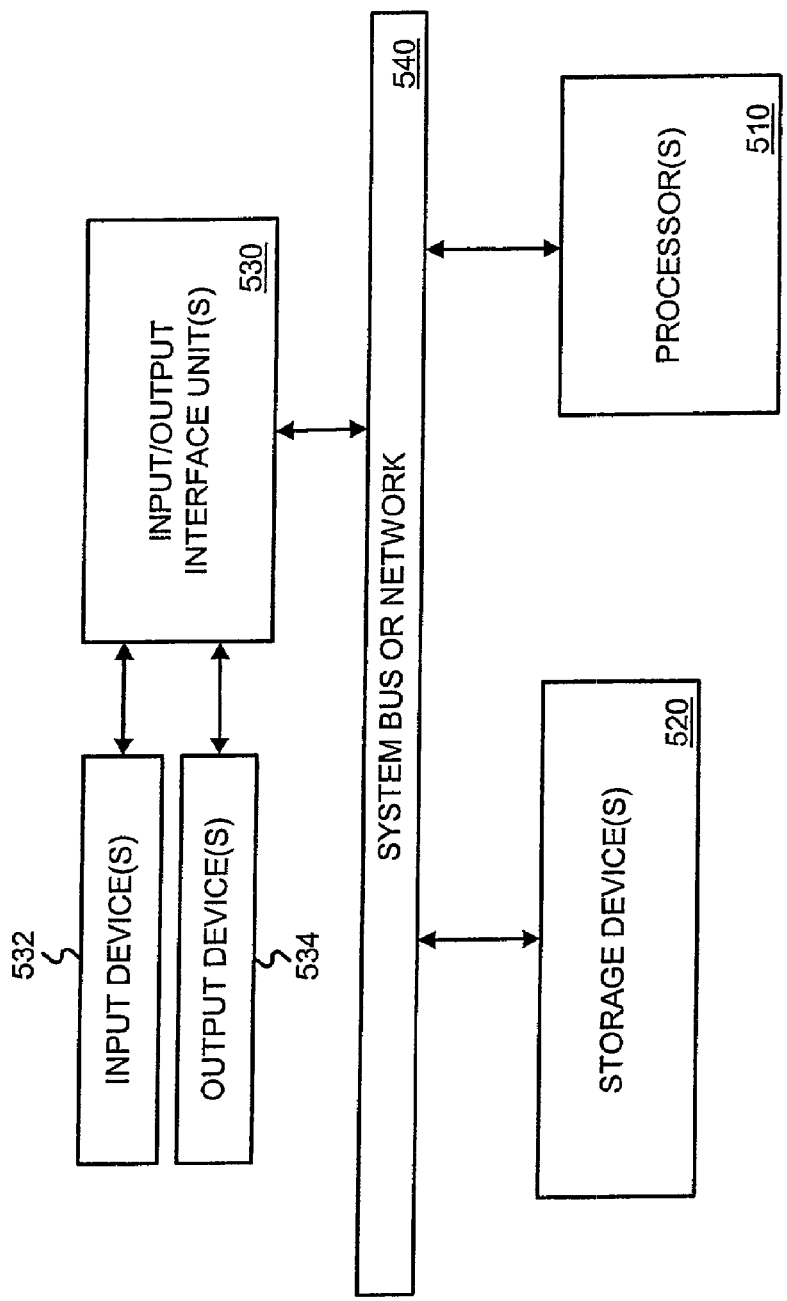
FIG. 5 is a high-level block diagram of apparatus that may be used to effect at least some of the various operations that may be performed in accordance with the present invention.

FIG. 5 is high-level block diagram of a machine 500 that may effect one or more of the operations discussed above. The machine 500 basically includes a processor(s) 510, an input/output interface unit(s) 530, a storage device(s) 520, and a system bus or network 540 for facilitating the communication of information among the coupled elements. An input device(s) 532 and an output device(s) 534 may be coupled with the input/output interface(s) 530.

The processor(s) 510 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the storage device(s) 520 and/or may be received from an external source via an input interface unit 530.

In one embodiment, the machine 500 may be one or more conventional personal computers. In this case, the processing unit(s) 510 may be one or more microprocessors. The bus 540 may include a system bus. The storage devices 520 may include system memory, such as read only memory (ROM) and/or random access memory (RAM). The storage device(s) 520 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 532, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 510 through an appropriate interface 530 coupled to the system bus 540. However, in the context of presentation ordering operation(s), no input devices, other than those needed to accept queries, and possibly those for system administration and maintenance, are needed.

The output device(s) 534 may include a monitor or other type of display device, which may also be connected to the system bus 540 via an appropriate interface. In addition to (or instead of) the monitor, the personal computer may include other (peripheral) output devices (not shown), such as speakers and printers for example. Again, in the context of presentation ordering operation(s), no output devices, other than those needed to communicate query results, and possibly those for system administration and maintenance, are needed.

§4.2 EXEMPLARY EMBODIMENTS

Figure 6:
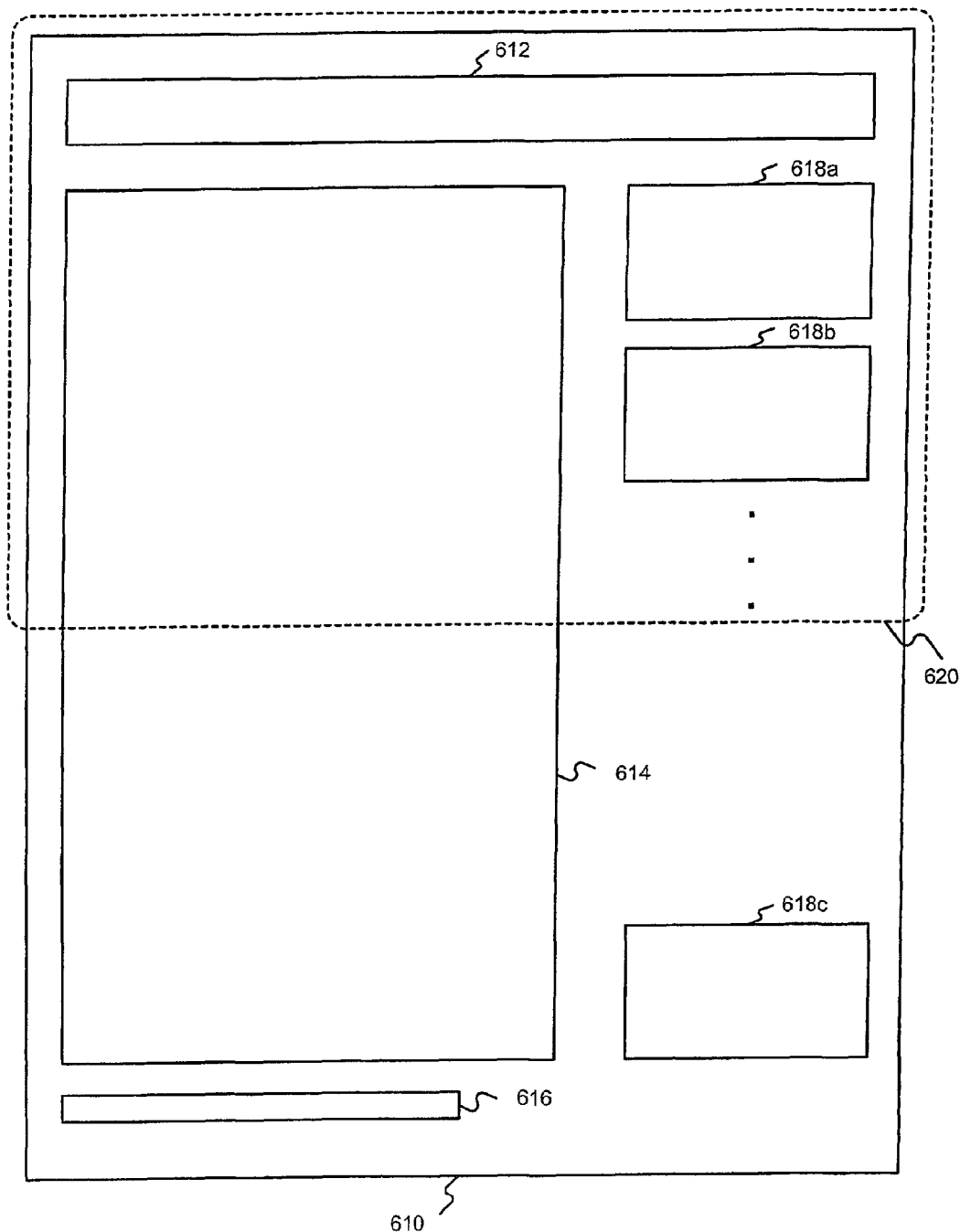
FIG. 6 is a block diagram of a Web page that may be generated by a page assembly operation of an ad consumer, for rendering on a viewer's screen.

The embodiments below will be described in reference to FIG. 6, which is an abstract illustration of a display page 610. The outline 620 depicted with dashed lines corresponds to a portion of the display page 610 that may be viewed on a typical personal computer display screen at a typical resolution. The exemplary display page 610 may include header information 612 (e.g., the name of search engine host), trailer information 616 (e.g., copyright, navigational hypertext links, etc.), a plurality of search results 614 and a plurality of ads 618*a*, 618*b*, and 618*c*. The search results 614 are maintained as distinct from the ads 618, so as not to confuse the user between paid advertisements and presumably neutral search results. Although FIG. 6 shows only three ads 618, embodiments consistent with the present invention may have more or less ads. For example, ten search results combined with ten ads has been found to be effective.

Figure 3:
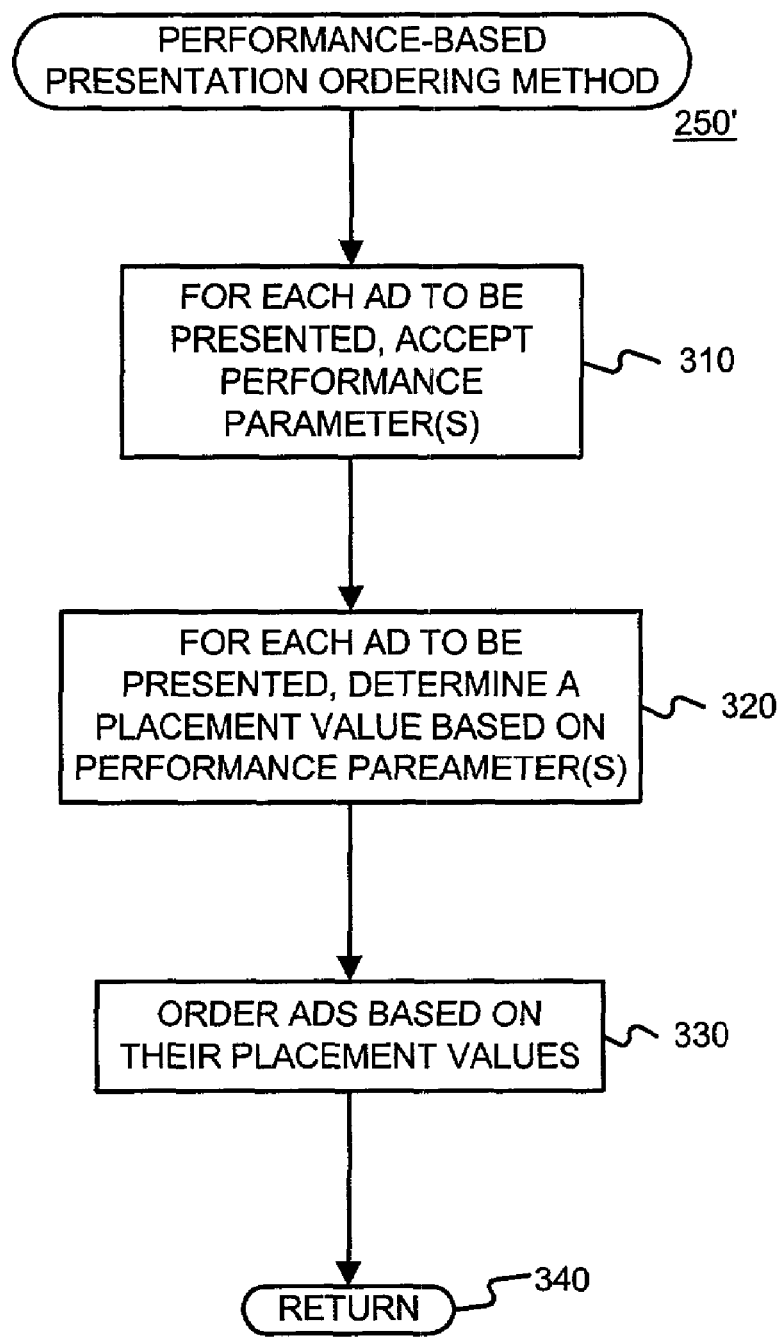
FIG. 3 is a flow diagram of a first exemplary method that may be used to effect a presentation ordering operation in an environment such as that of FIG. 2.

FIG. 3 is a flow diagram of an ordering method consistent with the present invention. As indicated by block 310, a list of candidate ads is obtained. Suppose this list contains four ads, called A, B, C, and D. Then, as indicated by block 320, one or more performance parameters (or more generally, "performance information") for each candidate ad is identified. Examples of a performance parameter include a click-through count, a click-through rate (e.g., the number of times an ad is selected divided by the number of times the ad is rendered), a conversion count (e.g., the number of times a transaction, associated with an ad, is consummated, either immediately or at some later time), a conversion rate, user ratings of the ad, focus group ratings of the ad, a measure of user interest for the ad weighted for a size of the ad relative to that of other ads, a measure of user interest for the ad weighted for past positions of the ad relative to those past positions of other ads, expected user interest in the ad, a time needed to render the ad relative to that needed to render other ads, and a measure of user interest for the ad weighted for a media type of the ad, etc. The performance parameter may be a combination of time-weighted performance parameter data. Window functions may be applied to performance parameter data.

A performance parameter of an ad may be keyword-dependent, or associated with a keyword or keywords. One example of a keyword-dependent performance parameter is an ad click-through rate for a given keyword(s). One embodiment of the present invention can apply a threshold to such a keyword-dependent performance parameter to determine whether or not to render a candidate ad when a query includes the keyword(s) that caused the ad to be deemed relevant. For example, if the click-through rate of a particular ad is below a predetermined value (e.g., 0.5%) for a particular keyword(s), that ad could either (a) not be rendered at all for the particular keyword(s), or (b) rendered less frequently that it would be otherwise for the particular keyword(s).

In one exemplary implementation, the performance parameter is a windowed, time-weighted function of (e.g., average) click-through rate for the ad. The time period for a window (both how long the window is and when in time the window begins) may be adjusted. For example, a long window will better reflect historical trends but may be less sensitive to recent changes. Similarly, the starting point (in time) for the window will affect its sensitivity to recent or historical information. Regardless of the window parameter, the data within the window may also be tuned. For example, rather than treating each data point within the window equally, it may be desirable to give some data points (e.g., more recent ones) greater weight than other data points. By adjusting the window and weighting parameters, therefore, one can customize the performance parameter (in this case click-through rate) to achieve desired results. A window size of the 1000 most recent impressions, weighted linearly such that the most recent impressions are favored, has been found to be effective. Similar modifications may be appropriate if performance parameters other than click-through rate are used.

Assume that ads A, B, C, and D have the following windowed, time-weighted average click-through rates, respectively: 5.1%, 0.3%, 7.2%, and 2.9%. Then, as indicated by block 330, a score is determined for each candidate ad based on the one or more performance parameter(s). Finally, as indicated by block 340, the ads may be ordered based on their scores, and the method 250' may then be left via RETURN node 350. In the present example, the order would be C, A, D, B.

The method described by FIG. 3 is particularly well suited for an environment wherein the advertiser pays each time the ad is shown (i.e., per impression), regardless of whether a user actually clicks on the ad. In one implementation, the cost to the advertiser varies based on the order of the ad. For example, an ad that is ranked first may cost $15.00 per thousand impressions (i.e., $15 CPM) whereas an ad that is ranked second may cost $12.00 per thousand impressions, and an ad that is ranked third may cost $10.00 per thousand impressions. This reflects an assumption that the higher ranked ads will be placed more prominently (e.g., higher on a search results page) and will thereby be more effective in attracting business from the viewer.

Figure 4:
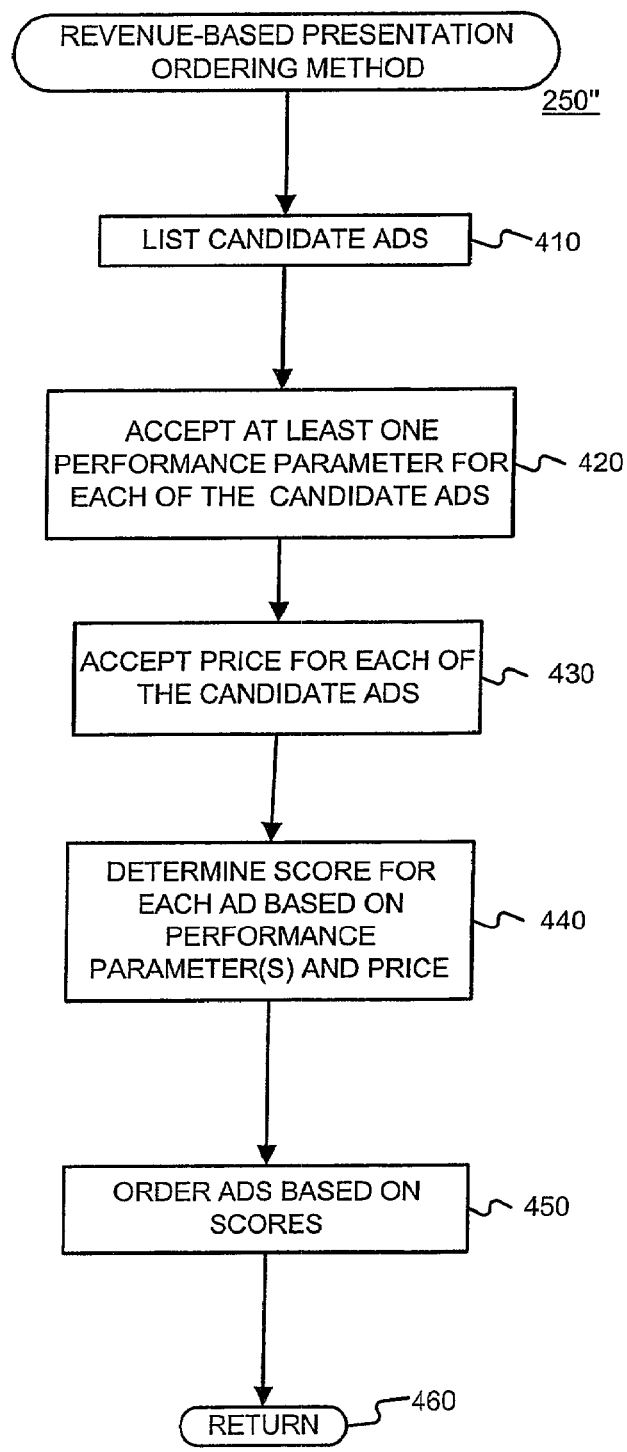
FIG. 4 is a flow diagram of a second exemplary method that may be used to effect a presentation ordering operation in an environment such as that of FIG. 2.

FIG. 4 is a flow diagram of another ordering method consistent with the present invention. As indicated by block 410, a list of candidate ads is obtained. Suppose again that this list contains the four ads described above in reference to FIG. 3: A, B, C, and D. Then, as indicated by block 420, one or more performance parameters (or more generally, "performance information") for each candidate ad is identified. In one implementation, the performance parameter is a windowed, time-weighted average click-through rate for the ad, as described above in reference to FIG. 3. Assume that ads A, B, C, and D have the following windowed, time-weighted average click-through rates, respectively: 5.1%, 0.3%, 7.2%, and 2.9%.

Similarly, as indicated by block 430, a price parameter (or more generally, "price information") is identified for each candidate ad. Examples of a price parameter include cost per impression, cost per selection (e.g., click-through), cost per conversion, etc. In one implementation, this price is a cost-per-click, which may be defined in advance as a negotiated or auction-based fee, or may be determined dynamically as a function of the ad's performance. Assume that at a given point in time, ads A, B, C, and D have the following costs-per-click, respectively: $0.30 per thousand clicks, $0.20 per thousand clicks, $0.10 per thousand clicks, and $0.20 per thousand clicks.

Then, as indicated by block 440, a score is determined for each candidate ad based on the one or more performance parameters and the price. In one implementation, this score is a product of the windowed, time-weighted average click-through rate and the cost-per-click. Accordingly, ad A has a score of 1.53 (5.1% multiplied by 0.30), ad B has a score of 0.06 (0.3% multiplied by 0.20), ad C has a score of 1.44 (7.2% multiplied by 0.20), and ad D has a score of 0.58 (2.9% multiplied by 0.20). Finally, as indicated by block 450, the ads may be ordered based on their scores, and the method 250' may then be left via RETURN node 460. In the present example, the order would be A, C, D, B.

In certain cases, it may be desirable to modify the score produced by the methods described by FIGS. 3 and 4, to take into account unique information. For example, it may be desirable to employ a multiplier (e.g., 1.3) to increase the ad scores of certain valued or strategic advertisers. Similarly, it may be desirable to employ a multiplier to increase the ad scores for campaigns that are time sensitive. There may, of course, exist other reasons to increase or decrease the scores for particular campaigns, ads, advertisers, etc. And such increases or decreases may be achieved by employing a multiplier to the overall resulting score, individual components of the score (e.g., click-through rate, cost-per-click, etc), etc. Other functions, including linear functions, polynomial functions, and exponential functions for example, may employ such coefficients or values to adjust scores. Statistical weighting (e.g., based on a deviation such as a standard deviation) may also be used to adjust price and/or performance information. Such time and/or statistical weighting may be used, for example, to desensitize the presentation ordering operation(s) to spikes or other anomalies.

Using the example page shown in FIG. 6, assume that the ad consumer 130 is a search engine that requested three ads. Using the method described in reference to FIG. 3, the three highest scoring ads (A, C, and D) would be returned, with ad C being shown in position 618a, ad A in position 618b, and ad D in position 618c. Using the method described in reference to FIG. 4, the three highest scoring ads (A, C, and D) would be returned, with ad A being shown in position 618a, ad C in position 618b, and ad D in position 618c. In an alternative embodiment, a relative size of other prominence feature of the ad, in addition to, or instead of, the placement order of the ads, may be based on the scores associated with the ads.

One factor to consider with methods consistent with the present invention is that it may be desirable not to show only the highest ranking ads. For example, it may be that new or low ranking ads have not been shown enough to have a statistically meaningful performance parameter. In this case (or even in general), one might artificially or temporarily increase the scores for certain ads (e.g., new or low ranking ads) at random, periodic, or other intervals. Alternatively, it may be desirable never to return ads with scores below a defined threshold, so long as they have been shown a statistically sufficient number of times to discern their performance.

As mentioned earlier, a potential benefit of the organization of exemplary display page 610 is that the search results 614 are maintained as distinct from the ads 618. The search results are ordered based on criteria that determines how relevant those information sources are to the search query entered by the user. The ads are ordered based on the methods described above. Yet by maintaining clear linear separation between the search results 614 and the ads 618, the user is not misled into confusing search results with paid advertisements. This allows the display of multiple ads on the same page as multiple search results while maintaining separation between the two such that a viewer can clearly distinguish search results from paid ads. Although display page 610 shows the advertisements positioned to the right of (adjacent) search results, other ways to separate the content from the advertisements are also possible. For example, the advertisements could be positioned to the left of (adjacent) search results.

§4.4 CONCLUSIONS

As can be appreciated from the foregoing disclosure, the advertising techniques described above account for the interests of users (e.g., users of a search engine) by providing them with ads that are of interest and that are not easily confused with noncommercial requested content (such as search results), if any. Further, the interests of the advertisers are well served since users will presumably be more likely to click-through on ads that are of interest to them.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, the presentation ordering operation(s) 250 can be distributed among various ad consumers 130, rather than operating centrally at the ad entry, maintenance and delivery system(s) 120.

What is claimed is:

1. A computer-implemented method comprising:
   a) accepting, with a computer system including at least one computer, a plurality of candidate ads;
   b) accepting, with the computer system, price information for each of the plurality of candidate ads;
   c) accepting, with the computer system, weighted performance information for each of the plurality of candidate ads;
   d) ordering, with the computer system, at least some of the plurality of candidate ads using both the price information and the weighted performance information, to generate a set of ordered ads; and
   e) serving, with the computer system, the set of ordered ads to induce presentation of the set of ordered ads to a user.

2. The computer-implemented method of claim 1, wherein each of the plurality of ads is associated with an advertiser, and wherein the price information is based on an amount the advertiser has agreed to pay each time the ad is rendered.

3. The computer-implemented method of claim 1, wherein each of the plurality of ads is associated with an advertiser, and wherein the price information is based on an amount the advertiser has agreed to pay each time the ad is rendered and selected.

4. The computer-implemented method of claim 1, wherein each of the plurality of ads is associated with an advertiser, and wherein the price information is based on an amount the advertiser has agreed to pay each time the ad is rendered and a conversion, associated with the ad, occurs.

5. The computer-implemented method of claim 1, wherein the weighted performance information includes weighted ad selection information.

6. The computer-implemented method of claim 1, wherein the weighted performance information includes weighted ad conversion information.

7. Apparatus comprising:
   a) at least one processor; and
   b) at least one storage device storing instructions, which when executed by the at least one processor, perform a method including
      1) accepting a plurality of candidate ads,
      2) accepting price information for each of the plurality of candidate ads,
      3) accepting weighted performance information for each of the plurality of candidate ads,
      4) ordering at least some of the plurality of candidate ads using both the price information and the weighted performance information, to generate a set of ordered ads, and
      5) serving the set of ordered ads to induce presentation of the set of ordered ads to a user.

8. The apparatus of claim 7, wherein each of the plurality of ads is associated with an advertiser, and wherein the price information is based on an amount the advertiser has agreed to pay each time the ad is rendered.

9. The apparatus of claim 7, wherein each of the plurality of ads is associated with an advertiser, and wherein the price information is based on an amount the advertiser has agreed to pay each time the ad is rendered and selected.

10. The apparatus of claim 7, wherein each of the plurality of ads is associated with an advertiser, and wherein the price information is based on an amount the advertiser has agreed to pay each time the ad is rendered and a conversion, associated with the ad, occurs.

11. The apparatus of claim 7, wherein the weighted performance information includes weighted ad selection information.

12. The apparatus of, claim 7, wherein the weighted performance information includes weighted ad conversion information.

* * * * *